United States Patent [19]

Ninoyu

[11] Patent Number: 5,155,682
[45] Date of Patent: Oct. 13, 1992

[54] APPARATUS FOR CONTROLLING SPEED OF VEHICLE

[75] Inventor: Yutaka Ninoyu, Oobu, Japan

[73] Assignee: Nippondenso Co. Ltd., Kariya, Japan

[21] Appl. No.: 510,239

[22] Filed: Apr. 17, 1990

[30] Foreign Application Priority Data

Apr. 17, 1989 [JP] Japan .................................. 1-96874

[51] Int. Cl.⁵ .......................................... B60K 31/04
[52] U.S. Cl. ............................ 364/424.1; 364/426.04; 74/866
[58] Field of Search ............... 364/424.1, 426.04; 74/866; 123/352; 180/179

[56] References Cited

U.S. PATENT DOCUMENTS

| | | | |
|---|---|---|---|
| 4,814,991 | 3/1989 | Tada et al. | 364/426.04 |
| 4,845,621 | 7/1989 | Kawata et al. | 364/424.1 |
| 4,853,673 | 8/1989 | Kido et al. | 364/424.1 |
| 4,905,786 | 3/1990 | Miyake et al. | 364/424.1 |
| 4,931,939 | 6/1990 | Kawata et al. | 364/426.04 |
| 4,933,859 | 6/1990 | Tsuyama et al. | 364/424.1 |

FOREIGN PATENT DOCUMENTS

| | | |
|---|---|---|
| 58-62340 | 4/1983 | Japan . |
| 58-72763 | 4/1983 | Japan . |
| 58-98636 | 6/1983 | Japan . |
| 58-113551 | 7/1983 | Japan . |
| 59-74350 | 4/1984 | Japan . |
| 60-76429 | 4/1985 | Japan . |
| 61-291225 | 12/1986 | Japan . |
| 62-85732 | 4/1987 | Japan . |
| 62-85733 | 4/1987 | Japan . |
| 62-168723 | 7/1987 | Japan . |
| 62-168724 | 7/1987 | Japan . |
| 62-168725 | 7/1987 | Japan . |
| 62-36889 | 8/1987 | Japan . |
| 62-231826 | 10/1987 | Japan . |
| 63-49534 | 3/1988 | Japan . |

Primary Examiner—Salvatore Cangialosi
Attorney, Agent, or Firm—Cushman, Darby & Cushman

[57] ABSTRACT

An apparatus for controlling speed of a vehicle to consist with a target speed in cruising mode, the vehicle having power transmission for selecting a gear ratio from plural predetermined gear ratios comprising: detector means for detecting the speed; and controller: for producing a first control signal for effecting downshifting to high when the speed decreases under the target speed; for detecting increase rate of the speed in response to the first control signal; and for producing a second control signal for effecting upshifting in response to said first control signal with delay determined by the increase rate. A negative pressure pump may be further provided for driving a negative pressure actuator controlling a throttle valve, the pump is turned on when the speed decreases under a given value before detection of lack of negative pressure downstream from a throttle valve, for driving negative pressure actuator controlling the throttle valve. A fail-safe system may be further provided which detects excessive flow rate of air-fuel mixture due to trouble at the negative pressure actuator in cruising mode for preventing unintentional and rapid acceleration.

18 Claims, 5 Drawing Sheets

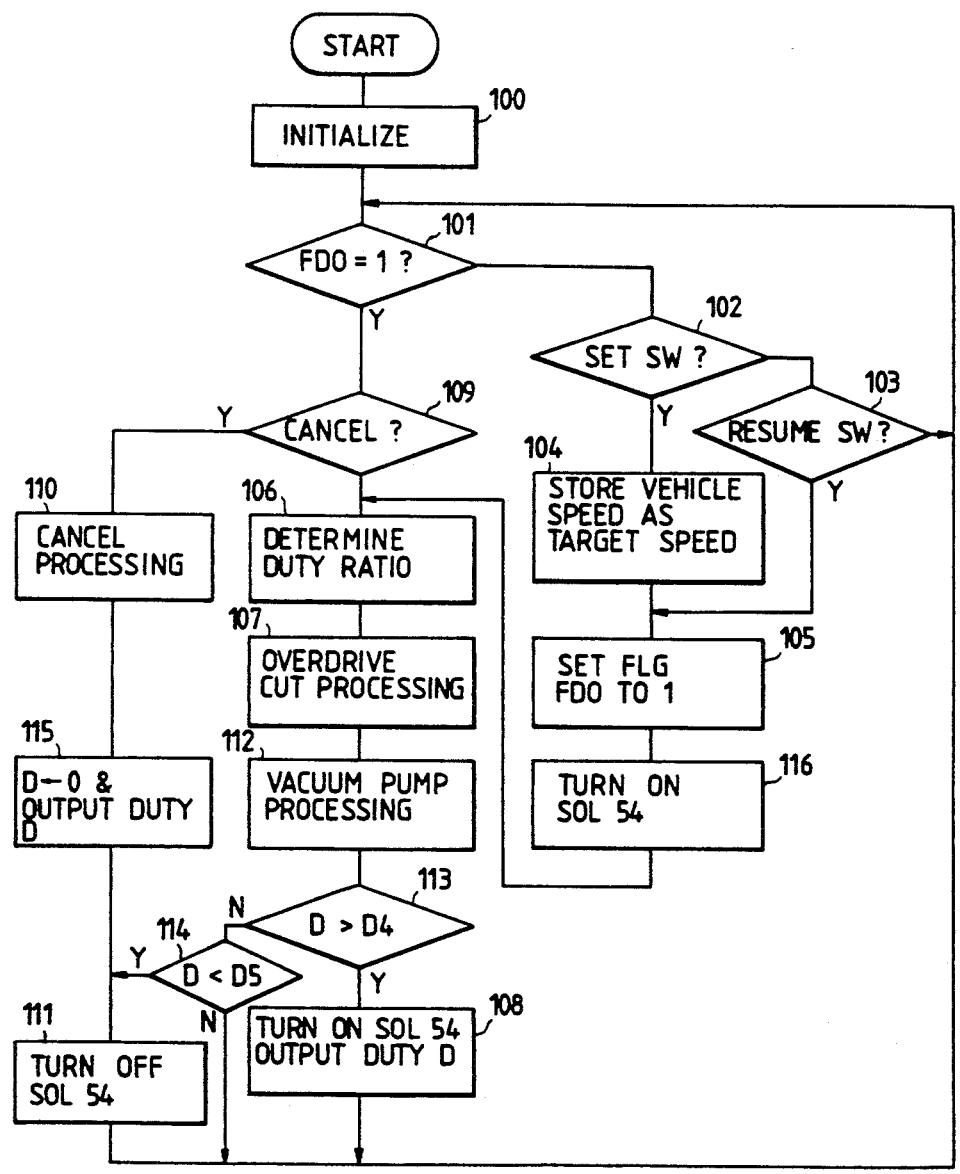

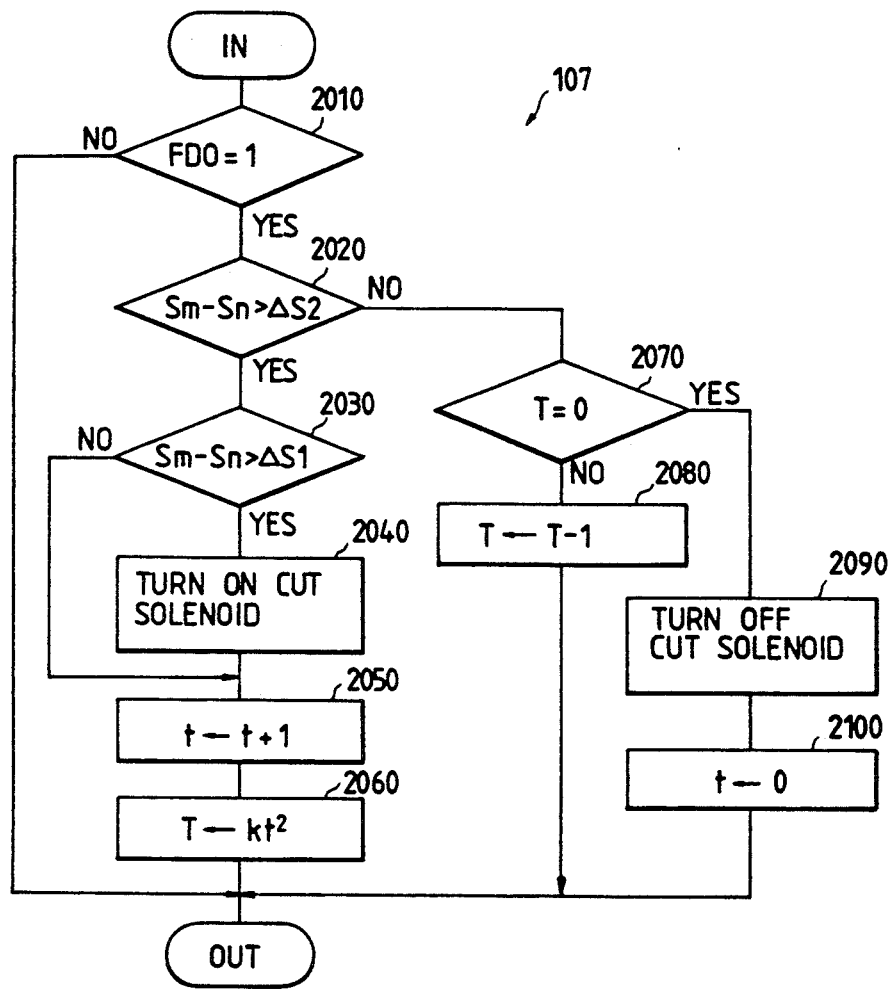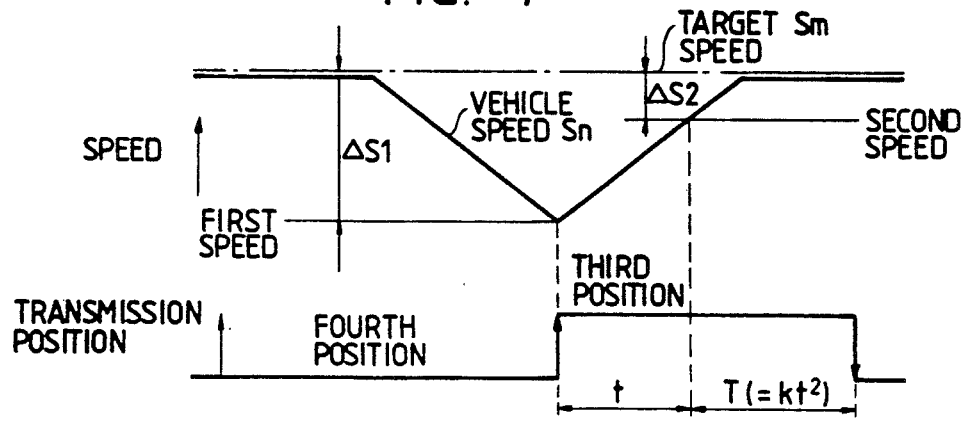

APPARATUS FOR CONTROLLING SPEED OF VEHICLE

BACKGROUND OF THE INVENTION

1. Field of the Invention

This invention relates to apparatus for controlling speed of a vehicle.

2. Description of the Prior Art

An apparatus for controlling speed of a vehicle to consist speed with a target speed is disclosed in Japanese patent publication 62-36889. In this prior art apparatus, when vehicle speed decreases by a first predetermined deviation from a target speed in constant speed traveling mode, i.e., cruising mode, on an uphill road, a power transmission is changed from fourth, i.e., overdriving, to third gear positions automatically to recover vehicle speed. Then, the power transmission is changed to fourth gear position again after a predetermined interval has passed from an instant when vehicle speed recovers to a second predetermined deviation from the target speed, the second predetermined deviation being smaller than the first predetermined deviation.

According to such apparatus, frequency of changing gear position of the transmission is suppressed, so that driving feeling is improved to some extent. However, if the predetermined interval is short in consideration with length of an uphill road, periodical gear changes between higher gear to lower gear positions occurs. On the other hand, when the predetermined interval is short in consideration with length of an uphill road, the vehicle runs with lower gear position even if the road condition changed from the uphill road to a level road for some time.

SUMMARY OF THE INVENTION

The present invention has been developed in order to remove the above-described drawbacks inherent to the conventional apparatus for controlling speed of a vehicle.

According to the present invention there is provided a first apparatus for controlling speed of a vehicle to a target speed, the vehicle having power transmission for selecting a gear ratio from plural predetermined gear ratios comprising: a detector for detecting the speed; and controller: for producing a first control signal for effecting downshifting when the speed decreases under the target speed; for detecting increase rate of the speed in response to the first control signal; and for producing a second control signal for in effecting upshifting response to the first control signal with delay determined by the increase rate.

According to the present invention there is also provided a second apparatus for controlling speed of a vehicle having power transmission for selecting a gear ratio from plural predetermined gear ratios comprising: speed detector for detecting the speed; a memory for storing an output signal from the speed detector as the target speed in response to manipulative operation switch; a speed control signal producing circuit for producing a speed control signal to consist the speed with the target speed in response to the output from the speed detector and to an output signal of the memory; a speed controller for controlling the speed in response to an output signal from the speed control signal producing circuit; a first detector responsive to an output signal from the speed detector for producing a first control signal when a deviation of the speed from the target exceeds a first given value; a power transmission control apparatus for effecting downshifting in response to an output signal from the first detector; a second detector responsive to an output signal from the speed detector for producing a detection signal when the deviation of the speed from the target decreases under a second given value which is smaller than the first given value; an estimation circuit for detecting running load of the vehicle by detecting increase rate of the speed in response to the first control signal and the detection signal; and a delay circuit responsive to the output signal from the detector and an output from the estimation circuit for producing for producing a second control signal for effecting upshifting with delay time determined by the increase rate.

According to the present invention there is further provided a third apparatus comprising second apparatus, wherein the speed control signal is produced by adding an initial value determined by the target speed to the deviation of the speed from the target speed; and wherein the speed control means comprises: a throttle valve provided in an intake passage of an internal-combustion engine; a negative pressure actuator for controlling the throttle valve, driven by negative pressure in the intake passage downstream from the throttle valve; a negative pressure sensor for detecting when the negative pressure decreases under a third given value; a negative pressure pump for supplying negative pressure of the negative pressure actuator; and drive circuit for driving the negative pressure pump in response to the speed control signal when the deviation exceed a fourth given value.

According to the present invention there is also provided a fourth apparatus comprising second apparatus, wherein the speed control means comprises: a throttle valve for controlling air-fuel mixture provided in an intake passage of an internal-combustion engine; and a negative pressure actuator for controlling the throttle valve, driven by negative pressure in the intake passge downstream from the throttle valve; and wherein the speed control signal producing means produces the speed control signal indicative of the flow rate of air-fuel mixture by adding an initial value determined by the target speed to deviation of the speed from the target speed, and the speed control signal producing means further comprising: detector responsive to the control signal for detecting that the flow rate exceeds a predetermined value; a circuit responsive to an output signal of the detection means for inhibiting deenergize of the negative pressure actuator.

According to the present invention there is also provided a fifth apparatus for controlling speed of a vehicle having power transmission for selecting a gear ratio from plural predetermined gear ratios comprising: a speed detector for detecting the speed; a memory for storing an output signal from the speed detector as the target speed in response to manipulative operation switch; a speed control signal producing circuit for producing a speed control signal to consist the speed with the target speed in response to the output from the speed detector and to an output signal of the memory; a speed controller for controlling the speed in response to an output signal signal from the speed control signal producing circuit; a first detector responsive to an output signal from the speed detector for producing a first control signal when a deviation of the speed from the target exceeds a first given value; a power transmission controller for effecting downshifting in response to an output signal from the first detector; a second detector responsive to an output signal from the speed detector for producing a detection signal when the deviation of the speed from the target decreases under a second given value which is smaller than the first given value; a time interval measuring circuit responsive to the first control signal and the detection signal for measuring time interval between production of the first control and the detection signal; and delay circuit responsive to the output signal from the detector and an output from the time interval measuring circuit for producing a second control signal for effecting upshifting with delay time determined by the time interval.

BRIEF DESCRIPTION OF THE DRAWINGS

The object and features of the present invention will become more readily apparent from the following detailed description taken in conjunction with the accompanying drawings in which:

FIG. 2 shows a flow chart executed by the apparatus shown in FIG. 1;

FIG. 3 shows a flow chart showing one of steps of FIG. 2;

FIG. 4 is a drawing for explaining operation in FIG. 2;

The same or corresponding elements or parts are designated at like references throughout the drawings.

DETAILED DESCRIPTION OF THE INVENTION

Figure 1:
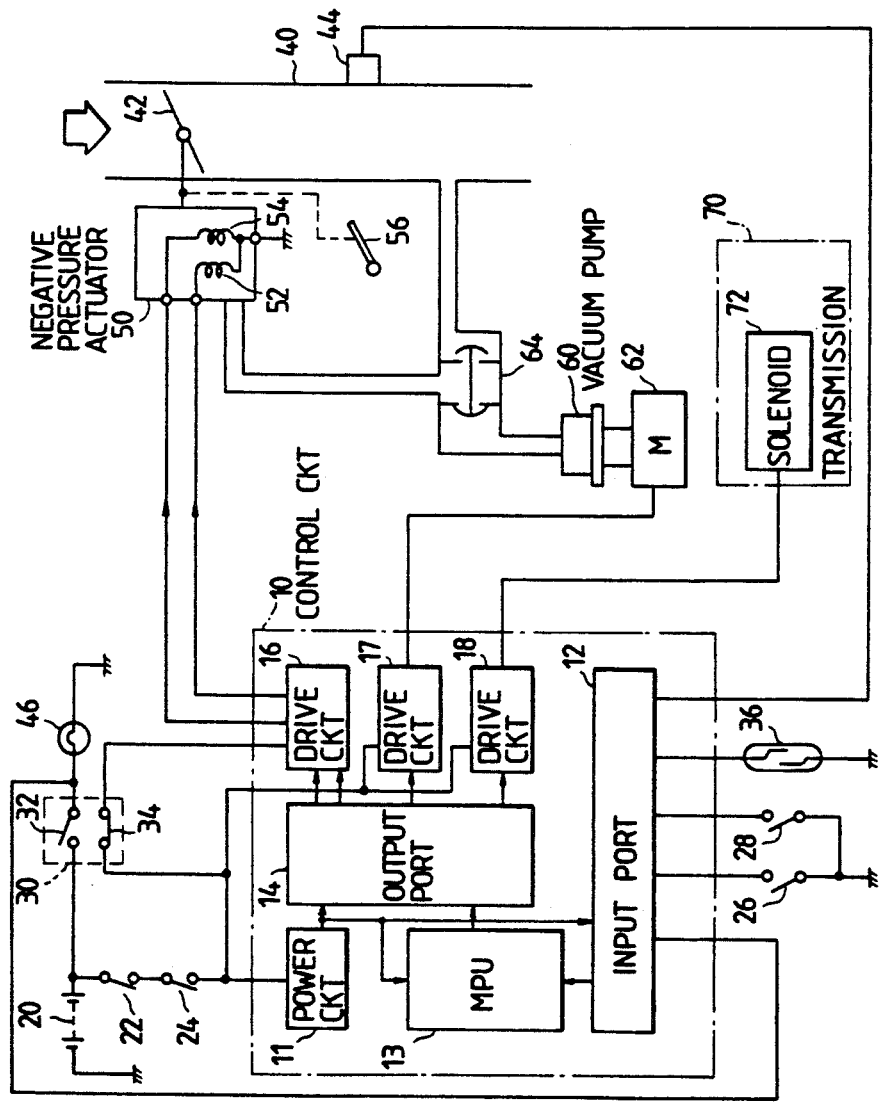
FIG. 1 is a block diagram of an embodiment of apparatus for controlling speed of a vehicle of the invention.

Referring now to FIG. 1, a schematic diagram is shown for describing basic structure of the present invention.

In FIG. 1, a control circuit 10 executes preset operation in response to input signals and produces control signals for actuators. The control circuit 10 comprises a power source circuit 11, an input port 12, a microprocessing unit (MPU) 13, an output port 14, and drive circuits 16, 17, and 18.

The power source circuit 11 is connected to a battery mounted on an unshown wheeled vehicle through an ignition switch 22 and a main switch 24. The power source circuit 11 supplies 5 volt power to the input port 12, MPU 13, and output port 14 by dc-dc converting.

The input port 12 is connected to a set switch 26 and a resume switch 28 which are operated by a driver and the input port 12 is also connected to a connection point between a cancel switch 32, included in a stop lamp switch 30, and a stop lamp 46. The stop lamp switch 30 is mechanically connected to an unshown brake mechanism which is operated by the driver, so that depress of an unshown brake pedal makes the stop lamp switch 32 close. Further, the input port 12 is connected to a vehicle speed sensor 36 provided to an output shaft of an automatic power transmission 70 for generating a digital signal indicative of vehicle speed and to a negative pressure switch 44 which makes contact when negative pressure downstream from a throttle valve 42 decreases under a given level. The negative pressure switch 44 is provided to an intake manifold 40 connected to respect chambers of an unshown engine of the unshown vehicle.

The stop lamp switch 30 comprises a power cut-off switch 34 whose contact opens only when the driver depresses the unshown brake pedal. On the other hand, the cancel switch 32 closes when the driver depresses the unshown brake pedal, so that the brake lamp turns on.

The MPU 13 comprises well-known microprocessor with RAM, and ROM and executes preset programs stored in the ROM in accordance with various signals obtained through the input port 12 to output control signals.

The output port 14 sends control signals to each drive circuits 16, 17, and 18 in response to the above-mentioned command signals.

An well-known negative pressure type actuator 50 drives the throttle valve 42 in response to drive signals sent from the drive circuit 16. One drive signal whose duty ratio D varies in accordance with the operation result by the MPU 13 is applied to a first solenoid 52. The solenoid 52 drives an unshown negative pressure control valve which introduces a negative pressure and the atmospheric pressure into a negative pressure chamber of the negative pressure type actuator 50 at a ratio determined by duty ratio D in constant speed running mode, i.e. cruising mode. The drive circuit 16 also sends another drive signal in response to another control signal from the MPU 13 to a second solenoid 54 driving an unshown negative pressure release valve for causing the negative pressure chamber of the negative pressure type actuator 50 to communicate with the atmospheric pressure. Thus, the negative pressure type actuator 50 is constructed so that the unshown negative pressure control valve of the negative pressure type actuator 50 introduces a negative pressure fully when the first solenoid 52 is energized at 100% duty and introduces atmospheric pressure into the negative pressure chamber when the first solenoid 52 is deenergized, i.e., 0% duty; and the negative pressure release valve causes the negative pressure chamber to communicate with atmospheric pressure when the second solenoid 54 is deenergized, i.e., negative pressure release valve is closed when energized. The throttle valve 42 is open or closed by an accelerator pedal 56 operated by the driver out of cruising mode.

A vacuum pump motor 62 is driven in response to a drive signal from the drive circuit 17. The vacuum pump 60 compensates decrease in negative pressure downstream from the throttle valve 42 of the intake manifold 40. Numeral 64 is an well-known check valve selectively supplying negative pressure from the intake manifold 40 downstream from the throttle valve 42 or the vacuum pump 60 in accordance with negative pressure level.

The drive circuit 18 is connected to an over drive cut solenoid (hereinbelow referred to as cut solenoid) 72 provided to the automatic power transmission 70 which is connected to an output shaft of the engine through an unshown clutch. The automatic power transmission 70 is so constructed that gear position is changed from the over drive gear (fourth) position, i.e., low gear ratio, to a lower gear position, i.e., high gear ratio, when the cut solenoid 72 is energized, in other words, down shifting is effected; on the other hand, gear position is changed from the lower gear position to the over drive position when the cut solenoid 72 is deenergized, in other words, upshifting is effected.

Hereinbelow will be described operation of apparatus for controlling speed of a vehicle.

When the main switch 24 is turned on by the driver during running of the vehicle, a constant voltage is applied to the control circuit 10 and this causes the input port 12, output port 14, microprocessor, and RAM of the MPU 13 to be initialized. Then, processing is executed in response to operation of each switch in accordance with the control program stored in the ROM, whose flow chart is shown in FIG. 2.

The description of basic operation for maintaining constant speed driving is described in Japanese patent application provisional publications No. 58-62340 and No. 58-72763.

When the set switch 26 is not operated, the vehicle speed is controlled by ordinary accelerator operation. When a constant voltage supply is applied to the control circuit 10, initialize is executed in step 100. Processing waits operation of the set switch 26 in the loop of steps 101, 102, and 103. When the contact of the set switch 26 is closed, and then, opened by the driver, processing branches off at step 102 and a vehicle speed from the vehicle speed sensor 36 is stored in RAM of the MPU 13 as a target speed in step 104. Then cruising mode set flag FDO is set for starting cruising mode processing in the succeeding step 105. In the following step 116, the solenoid 54 is turned on to close the unshown negative pressure release valve and processing proceeds to the following step 106. During cruising mode, a duty ratio D of the drive signal for the first solenoid 52 actuating the negative pressure control valve of the negative pressure type actuator 52 is determined by:

$$D = D_o + Q \cdot [Sm - (Sn + Sf)]$$

where
$D_o$ is an initial duty ratio for the targe speed;
Q is a control gain;
Sm is a target speed;
Sn is a vehicle speed; and
Sf is predicted vehicle speed variation amount.

Thus, the flow rate of air-fuel mixture through the intake manifold 40 in this state is determined by the duty ratio D. Then, controlling for the negative pressure type actuator 50 is executed in step 108 actually. In cruising mode, loop of steps 101, 109, 106, 107, 112, 113, and 108 are executed continuously to maintain the vehicle speed to the target speed. In step 113 and 114, fail-safe control is executed if D>D2. Normally, in cruising mode, processing advances to step 108 from step 113. This fail-safe control is described later. Also, steps 107 and 112 are described later.

When the driver operates the unshown brake pedal in cruising mode, a contact of the cancel switch 32 is closed. This causes cruising processing to be reset. In other words, processing branches off at step 109. In following step, cancel processing is executed. For example, cruising mode flag FDO is reset. In the succeeding step 115, duty D is set to zero and is output. In the following step 111, the negative pressure type actuator 50 is turned off. At the same time, the switch 34 is closed so that power supply to the first and second solenoids 52 and 54 is cut off. This causes the throttle valve 42 to close totally. This is because the atmospheric pressure is introduced into the negative pressure chamber of the negative pressure type actuator 50 so that the throttle valve 42 is free from control of the negative pressure actuator 50 and because the throttles valve is spring loaded.

When the resume switch 28 is closed momentarily by the driver, cruising processing is resumed in step 103, using the target speed stored when the driver operated the set switch 26 to start cruising mode.

Step 107 executed in cruising mode loop includes overdrive cut processing described as follows:

When decrease amount from the target speed Sm to vehicle speed Sn exceeds a given value ΔS1 in cruising mode, due to an uphill road, the MPU 13 executes a processing shown in a flow chart of FIG. 3.

Processing starts at step 2010 where a determination is made as to whether cruising mode flag is set. In the succeeding step 2020, a determination is made as to whether deviation from the target speed Sm to the present vehicle speed Sn is larger than a given value ΔS2(ΔS1>ΔS2). When deviation is larger than S2, processing proceeds to step 2030. In step 2030, a determination is made as to whether deviation from the target speed Sm to the present vehicle speed Sn is larger than ΔS1. When deviation is larger than S1, processing proceeds to step 2040. In step 2040, the MPU 13 sends a control signal to the drive circuit 18 to turn on the cut solenoid 72. Therefore, gear position of the power transmission 70 is changed from over drive gear position, i.e., fourth gear position, to lower gear position, i.e., third gear position. Next, increment is done in a counter t in step 2050 and then in step 2060, a value of $kt^2$ is set to a variable timer whose counter T is decreased at every given interval. Therefore, the larger count t, the larger delay time of the variable timer. Then, processing returns to the main flow shown in FIG. 2.

In step 2030, if Sm−Sn is smaller than S1, processing proceeds to step 2050 directly.

In step 2020, if Sm−Sn is smaller than ΔS2, processing proceeds to step 2070 where a determination is made as to whether the counter of the variable timer is equal to zero. If the counter T of the variable timer is not equal to zero, decrement is carried out in the counter of the variable timer T in step 2080. Then, processing returns to the main flow.

In step 2070, if counter T is zero, operation proceeds to step 2090 where the MPU 13 sends a control signal for turn off the cut solenoid 72 to the drive circuit 18. Then, in step 2100, the MPU 13 resets the counter t and then the processing returns to the main flow.

Hereinbelow will be described operation of the above mentioned processing.

As shown in FIG. 4, the cut solenoid 72 is turned on when decrease amount from the target speed Sm to vehicle speed Sn exceeds the given value ΔS1 in cruising mode, due to an uphill road at a first speed. This causes the gear position of the power transmission 70 to be changed from the overdrive position to third position. Then, the vehicle speed starts to be recovered. After a while, the vehicle speed Sn increases to a second speed which is lower than the target speed Sm by the given value ΔS2. The interval necessary for recovering of the vehicle speed from the first to second speed is measured by the counter t. Next, the MPU 13 turns off the cut solenoid 72 after an interval determined by count T, i.e., when interval of $kt^2$ has been passed from a moment the vehicle speed recovers to the second speed. This changes gear position of the power transmission 70 from third to overdrive positions.

Thus, if a road condition is of long steep uphill road, the time interval for recovering the vehicle speed to the second speed is long, so that the value of the counter t is large and thereby the value of the timer is large. Therefore, gear position change from third to fourth is delayed for a relatively long time after the vehicle speed has been recovered to the target speed Sm. As a result, the number of change of gear position between third and fourth is considerably reduced on a long and steep uphill road.

If road condition is short and steep uphill road, the interval necessary for recovering the vehicle speed to the second speed is short, so that the value of the counter t is small and thereby delay time of the timer counter T is also small. As a result, gear position change to overdrive position is short, so that this sufficiently suppresses third-gear-position running after the vehicle speed is recovered to the target speed Sm.

In other words, this apparatus controls interval between recovery of vehicle speed to the target speed and resume of overdrive gear position running by detecting steepness, i.e., running load, of the uphill road from the counter value t.

Hereinbelow will be described controlling of the vacuum pump 60 with reference to FIG. 5 of a flow chart executed by the MPU 13.

Negative pressure downstream from the throttle valve 42 is used as a power source for the negative pressure type actuator 50. If this negative pressure decreases, the negative pressure type actuator 50 cannot sufficiently open the throttle valve 42. Thus, the negative pressure switch 44 is provided for detecting decrease in negative pressure downstream from the throttle valve 42. The control circuit 10 drives the vacuum pump 60 in response to a detection signal from the negative pressure switch 44 to compensate lack of negative pressure.

However, there is time delay from detection of decrease in negative pressure to production of sufficient negative pressure. Thus, if the vacuum pump motor 62 is driven after the negative pressure switch 44 detects decrease in negative pressure, further decrease in negative pressure occurs, so that the vehicle speed decreases. In this embodiment, the MPU 13 output a control signal for the vacuum pump 60 when a difference $\Delta D$ between the present duty D and the initial duty ratio $D_o$ exceeds a first increase amount D1 irrespective of condition of the negative switch 44 as shown the flow chart of FIG. 5. This processing is executed in step 112, shown in FIG. 2, which is one of cruising mode processing.

Figure 5:
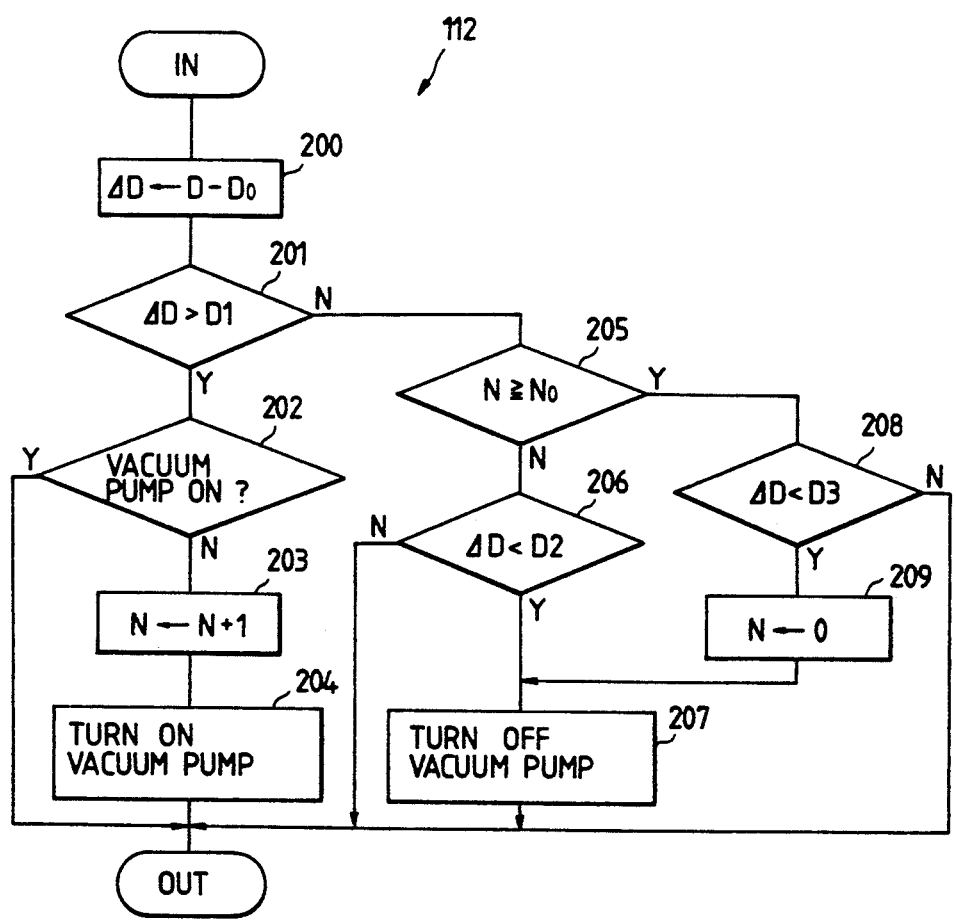
FIG. 5 shows a flow chart showing another step of FIG. 2.
Figure 6:
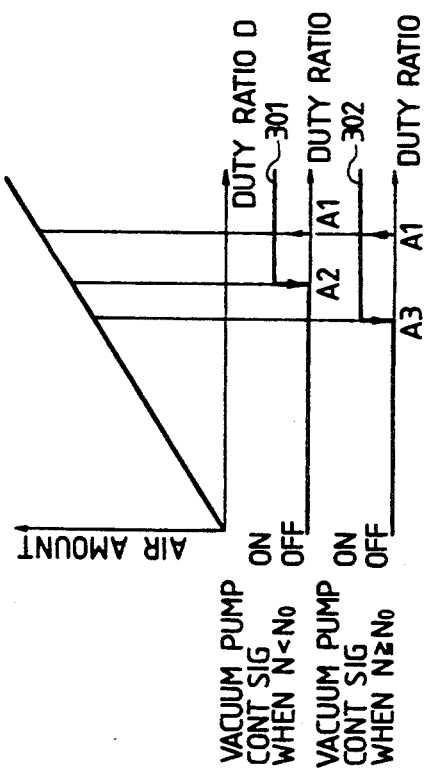
FIG. 6 is a drawing for explaining operation in FIG. 5.

In FIG. 5, in step 200, the difference $\Delta D$ is determined by subtracting the initial duty ratio $D_o$ from the present duty ratio D. Next, in step 201, a decision is made as to whether difference $\Delta D$ is grater than the first increase amount D1. If the $\Delta D$ is grater than the first increase amount D1, processing proceeds to step 202. In step 202, the MPU 13 checks whether the vacuum pump is turn on. In other words, a vacuum pump 60 is turned on at duty A1, as shown in FIG. 6 which shows relation between duty ratio D and air amount and points of turn on or off of the vacuum pump 60. If the vacuum pump 60 is not turned on, processing proceeds to step 203 where a number N is counted up and to step 204 where the control signal for turning on the vacuum pump 60 is outputted. Then processing returns to the main flow. If the vacuum pump 60 is turned on in step 202, processing returns to the main flow directly. In other words, the vacuum pump has been operated already and the overdrive cut processing processing 107 is started to be execute then processing returns to the main flow form step 202.

The vacuum pump 60 is stopped to operate when difference $\Delta D$ decrease to a second increase amount D2 where the first increase amount D1 is grater than the second increase amount D2, as shown by waveform 301 in FIG. 6. In other words, the vacuum pump 60 is turned off at duty A2. Moreover, if the number of turn on and off of the vacuum pump 60 exceeds a given number $N_o$, the vacuum pump 60 is turned off when difference $\Delta D$ is smaller than a third increase amount which is smaller than the second increase amount D2, so that the number of turn on and off of the vacuum pump is reduced. In other words, the vacuum pump is turned on or off at duty A1 and A3 respectively.

In step 201, if $\Delta D$ is not greater than the first increase amount D1, in other words, the vehicle speed recovers by processing of step 107, processing proceeds to step 206 through 205. In step 206, a decision is made as to whether deference $\Delta D$ is smaller than D2. If difference $\Delta D$ is smaller than D2, the vacuum pump 60 is turned off. Then, processing return to the main flow. Processing branches off in step 205 where a decision is made as to whether the number N is equal to or grater than a given number $N_o$. If the number N is equal to or grater than a given number $N_o$, processing proceeds to step 206, as mentioned above. If the number N is less than the given number $N_o$, processing proceeds to step 208 where a decision is made as to whether the difference $\Delta D$ is smaller than the D3. If the difference $\Delta D$ is smaller than the D3, the number N is reset and the vacuum pump 60 is turned off in step 207 and then processing returns to the main flow. If the difference $\Delta D$ is not smaller than the D3, processing returns to the main flow directly.

According to the above-mentioned control, negative pressure by the vacuum pump 60 can be supplied to the negative actuator 50 before excessive decrease in negative pressure down stream from the throttle valve 42 occurs, so that negative pressure as a power source of the negative pressure type actuator 50 is stably supplied. Further, the number of turn on and off of the vacuum pump 60 is reduced even if the vehicle runs on uphill where steep and moderate slopes continue alternately. In such conditions, large and small opening degrees of the throttle valve 42 occur alternately. Thus, the number of turn on and off of the vacuum pump 60 is reduced, so that life time of the vacuum pump is substantially increased and stable running where speed change is small is provided.

Hereinbelow will be described fail-safe processing of steps 113 and 114 in FIG. 2.

Figure 7:
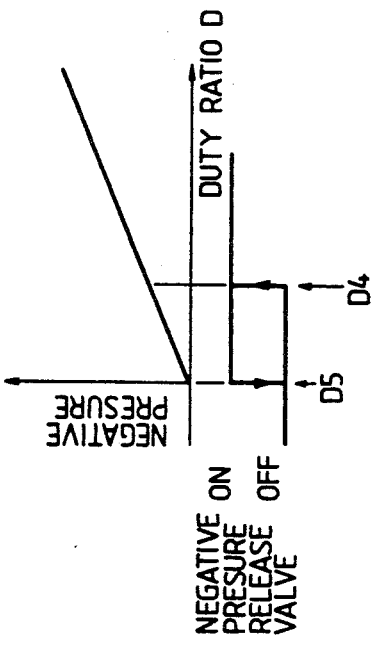
FIGS. 7 and 8 are a drawing for explaining operation in FIG. 2.
Figure 8:
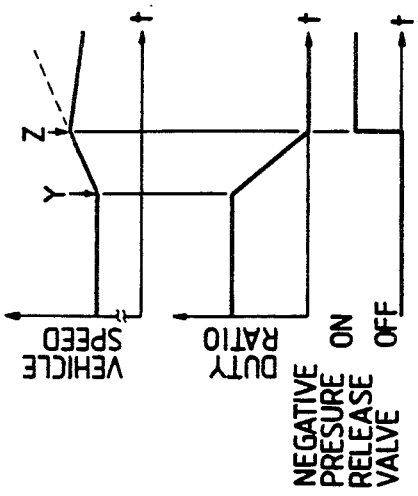

In cruising mode, if duty D is larger than D2, i.e., the throttle valve 42 is controlled in accordance with duty ratio D normal, processing advances from step 112 to step 108 through step 113. However, if trouble occurs in the first solenoid 52 in energized condition, there is a possibility that rapid acceleration is made by large opening degree of the throttle valve by continuously introduction of negative pressure into the negative pressure chamber. FIG. 8 shows vehicle speed change where such trouble occurs at instant Y. When unintentional opening degree of the throttle valve 42 occurs at instant Y, the vehicle speed increases so that duty D decreases, as shown in FIG. 8 because increased vehicle speed is detected by the vehicle speed sensor 36 and then, duty ratio D for increased vehicle speed is determined by step 106. If duty D decrease under D5, for example, 1%, at instant Z, the negative release valve is opened to allow the throttle 42 to be free from control of the negative pressure type actuator 50. Thus, after instance Z, the vehicle speed decreases, as shown in FIG. 8. Moreover, if duty ratio D exceeds D4, the negative pressure release valve is not closed at once, but is closed when duty ratio D exceeds D4, for example 6%, to have hysterisis loop control, as shown in FIG. 7 where negative pressure release valve is turned on and off at different duty ratio D.

This control is executed in steps 113 and 114. In step 113, a decision is made as to whether duty D is larger than D4. If duty D is not larger than D4 processing proceeds to step 114. In step 114, a decision is made as to whether D is smaller than D5. If duty D is smaller than D5, processing proceeds to step 111 where the solenoid 54 is turned off, i.e., the negative pressure release valve is opened to release negative pressure in the negative pressure chamber. If duty D is not smaller than D5 in step 114, the solenoid 54 is not turned off and processing proceeds to step 101. When the solenoid 54 is tuned off, the throttle 42 is free from control of the negative pressure type actuator 50. Then, the vehicle speed decreases and if duty D exceeds D5 (6%), processing proceeds from step 113 to step 108 where the solenoid 54 is turned on, i.e., the negative pressure release valve is closed and duty ratio D is outputted to control the negative pressure control valve.

As mentioned above, this fail-safe control limits rapid acceleration to small extent even if the negative control valve operates improperly.

What is claimed is:

1. An apparatus for controlling speed of a vehicle in relation to a target speed, said vehicle having power transmission for selecting a gear ratio from a plurality of predetermined gear ratios, means for outputting vehicle speed signals indicative of said vehicle speed, and means for controlling a throttle to regulate said vehicle speed to said target speed in response to a variation of said vehicle speed as indicated by said vehicle speed signals, said apparatus comprising means for controlling said power transmission, said power transmission controlling means comprising:

first means for generating, in accordance with said vehicle speed signals, first control signals to cause downshifting of said power transmission when said vehicle speed decreases below said target speed;

means for estimating, in accordance with said vehicle speed signals, an amount that said vehicle speed has increased towards said target speed due to said downshifting of said power transmission and outputting amount signals indicative of said amount, said amount being a portion of a difference between said target speed and said vehicle speed when said first control signals are generated means for calculating a delay period based on said amount signals and outputting delay period signals indicative of said delay period; and second means for generating, at a time determined in accordance with said delay period signals, second control signals to cause upshifting of said power transmission.

2. An apparatus as in claim 1, wherein said delay period is proportional to said amount estimated by said estimating means.

3. An apparatus as in claim 1, wherein said generating means generates said first control signals when said difference between said vehicle speed and said target speed exceeds a first predetermined value.

4. An apparatus as in claim 1, wherein said power transmission controlling means further comprises means for detecting a running load imposed on said motor vehicle, said running load being indicative of a gradient of a hill up which said vehicle is traveling, and said power transmission controlling means generating said first control signals in accordance with said running load.

5. An apparatus as in claim 4, wherein said portion is a second difference between said vehicle speed when said first control signals are generated and said vehicle speed when said difference between said vehicle speed and said target speed decreases below a second predetermined value, said second predetermined value being smaller than said first predetermined value.

6. An apparatus as in claim 5, wherein said estimating means estimates said amount by measuring a time interval between generation of said first control signals to an instant that said difference between said vehicle speed and said target speed decreases below said second predetermined value.

7. An apparatus as in claim 6, wherein said delay period is calculated in accordance with said time interval.

8. An apparatus as in claim 7, wherein said delay period is proportional to an arithmetic square of said time interval.

9. An apparatus for controlling speed of a vehicle having power transmission for selecting a gear ratio from a plurality of predetermined gear ratios, said apparatus comprising:

first means for detecting said vehicle speed and providing first signals indicative of said vehicle speed;

means for storing, in response to second signals provided by an operation switch, said first signals as a target speed, said storing means providing third signals indicative of said target speed;

first means, responsive to said first and said third signals, for generating first control signals when a difference between said vehicle speed and said target speed exceeds a first predetermined value;

means for controlling said power transmission, said power transmission controlling means downshifting said power transmission in response to said first control signals;

second means, responsive to said first and said third signals, for generating detection signals when said difference between said vehicle speed and said target speed decreases means for estimating a running load imposed on said vehicle by determining an increase rate of said vehicle speed, said running load being proportional to a gradient of a hill up which said vehicle is traveling, said increase rate being determined in accordance with said first control signals and said detection signals, said estimating means providing increase rate signals indicative of said increase rate; and delay means for calculating a delay time in accordance with said increase rate signals and providing, at a time in accordance with said delay time, second control signals to said power transmission controlling means to cause said power transmission controlling means to upshift said power transmission.

10. An apparatus as in claim 9, wherein said delay time is proportional to said increase rate.

11. An apparatus as in claim 9, wherein said estimating means determines said increase rate based on a time interval between generation of said first control signals and reception of said detection signals by said estimating means.

12. An apparatus as in claim 11, wherein said delay time is proportional to a mathematical square of said time interval.

13. An apparatus as in claim 11, wherein said first generating means generates said first control signals by adding an initial value, derived from said target speed, to said difference between said vehicle speed and said target speed, and
wherein said power transmission controlling means comprises:
a throttle valve provided in an intake passage of an internal-combustion engine;
negative pressure actuator means for controlling said throttle valve, said negative pressure actuator being driven by negative pressure in said intake passage;
negative pressure pump means for supplying additional negative pressure to said negative pressure actuator means; and
means for driving said negative pressure pump means in response to said first control signals when said difference between said vehicle speed and said target speed exceeds said first predetermined value.

14. An apparatus as in claim 13, wherein said driving means turns off said negative pressure pump means when said difference between said vehicle speed and said target speed decreases below a second predetermined value, said second predetermined value being smaller than said first predetermined value, said drive means further comprising means for counting a number of times said negative pressure pump means is switched on and off, and means for reducing said second predetermined value when said number counted exceeds a predetermined number.

15. An apparatus as in claim 9, wherein said power transmission controlling means comprises:
throttle valve means for controlling air-fuel mixture provided in an intake passage of an internal-combustion engine; and
negative pressure actuator means for controlling said throttle valve means, said negative pressure actuator means being driven by negative pressure in said intake passage;
and wherein said first generating means generates said first control signals by adding an initial value, derived from said target speed, to said difference between said vehicle speed and said target speed, said first control signals being indicative of a flow rate of said air-fuel mixture, and
said first generating means further comprising:
second means, responsive to said first control signals, for detecting that said flow rate exceeds a second predetermined value, said second detecting means outputting flow rate signals indicative of said flow rate; and
means, responsive to said flow rate signals, for inhibiting de-energization of said negative pressure actuator means.

16. An apparatus as in claim 9, wherein said second generating means generates said detection signal when said difference between said vehicle speed and said target speed decreases below a second predetermined value, said second predetermined value being smaller than said first predetermined value.

17. An apparatus for controlling speed of a vehicle having power transmission for selecting a gear ratio from a plurality of predetermined gear ratios, said apparatus comprising:
first means for detecting said vehicle speed and providing first signals indicative of said vehicle speed;
means for storing, in response to second signals provided by an operation switch, said first signals as a target speed, said storing means providing third signals indicative of said target speed;
first means, responsive to said first and said third signals, for generating first control signals when a difference between said vehicle speed and said target speed exceeds a first predetermined value;
means for controlling said power transmission, said power transmission controlling means downshifting said power transmission in response to said first control signals;
second means, responsive to said first and said third signals, for generating detection signals when said difference between said vehicle speed and said target speed decreases
means, responsive to said first control signals and said detection signals, for measuring a time interval between generation of said first control signals and said detection signals, said measuring means outputting time interval signals indicative of said time interval; and
delay means for calculating a delay time in accordance with said time interval signals and providing, at a time in accordance with said delay time, second control signals to said power transmission controlling means to cause said power transmission controlling means to upshift said power transmission.

18. An apparatus as in claim 17, wherein said delay time is proportional to said time interval.

* * * * *